United States Patent [19]

Keating

[11] Patent Number: 5,213,374

[45] Date of Patent: May 25, 1993

[54] COUPLING RING AND METHOD OF MAKING SAME

[75] Inventor: Henry M. Keating, Grosse Pointe Woods, Mich.

[73] Assignee: Keating Koupling, Inc., Six Mile, S.C.

[21] Appl. No.: 776,592

[22] Filed: Oct. 11, 1991

[51] Int. Cl.⁵ .............................................. F16L 55/00
[52] U.S. Cl. ........................................ 285/23; 285/61; 285/93; 285/331; 285/370; 285/371; 285/404; 285/424; 285/383; 228/17.5; 228/173.6
[58] Field of Search ............... 285/424, 331, 369, 370, 285/371, 397, 398, 417, 915, 383, 23, 61, 93, 404, 158; 228/17.5, 173.6

[56] References Cited

U.S. PATENT DOCUMENTS

| | | |
|---|---|---|
| 180,416 | 8/1876 | Clow . |
| 394,479 | 12/1888 | Evans et al. . |
| 1,762,766 | 3/1928 | De Garay . |
| 1,811,277 | 6/1929 | Mosley . |
| 1,921,642 | 7/1931 | Stephenson . |
| 2,275,572 | 5/1939 | Somers . |
| 2,535,186 | 12/1946 | Anderson . |
| 3,246,918 | 4/1966 | Burghart ......................... 285/331 X |
| 3,415,543 | 12/1968 | Keating . |
| 3,689,114 | 9/1972 | Meserole . |
| 3,905,621 | 7/1974 | DeMarco . |
| 4,249,758 | 2/1981 | Harris .................................. 285/158 |
| 4,447,078 | 5/1984 | Jenkins . |
| 4,558,892 | 12/1985 | Daw et al. . |
| 4,566,724 | 1/1986 | Arnoldt et al. ................. 285/424 X |
| 4,669,762 | 6/1987 | Jenkins . |
| 4,941,693 | 7/1990 | Spaude et al. . |
| 5,054,823 | 10/1991 | Arnoldt ............................... 285/424 |

Primary Examiner—Dave W. Arola
Attorney, Agent, or Firm—Brooks & Kushman

[57] ABSTRACT

A coupling ring for circular ducts is formed of a single piece of sheet metal and has oppositely extending flanges connected together by an annular channel-shaped rib which cooperatively with the flanges defines oppositely opening grooves containing sealant. The relative dimensions of the grooves is such that a hydraulic lock is avoided at the time the coupling ring is telescoped onto the ducts. Proper sealing can be visually determined by inspection.

13 Claims, 2 Drawing Sheets

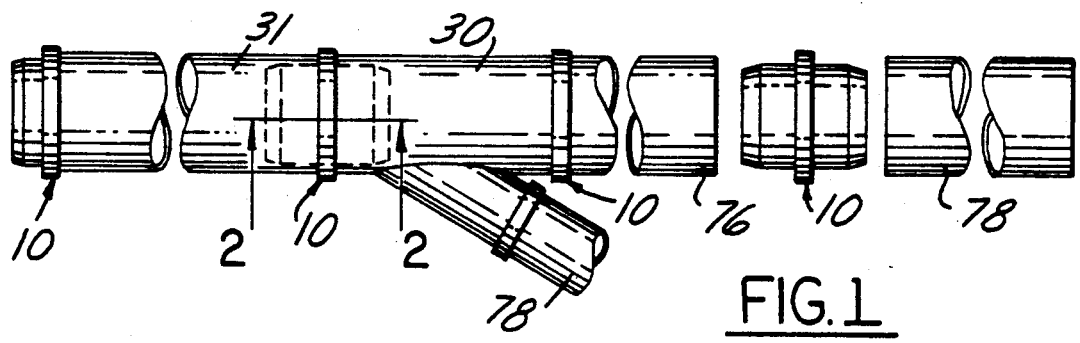
FIG. 1
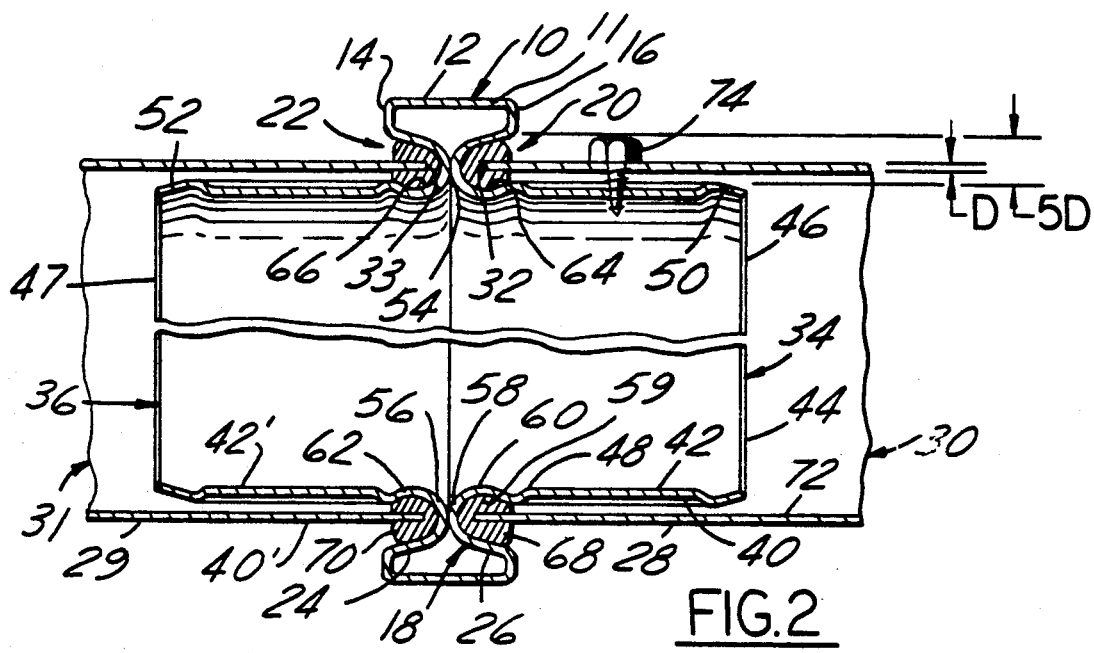
FIG. 2
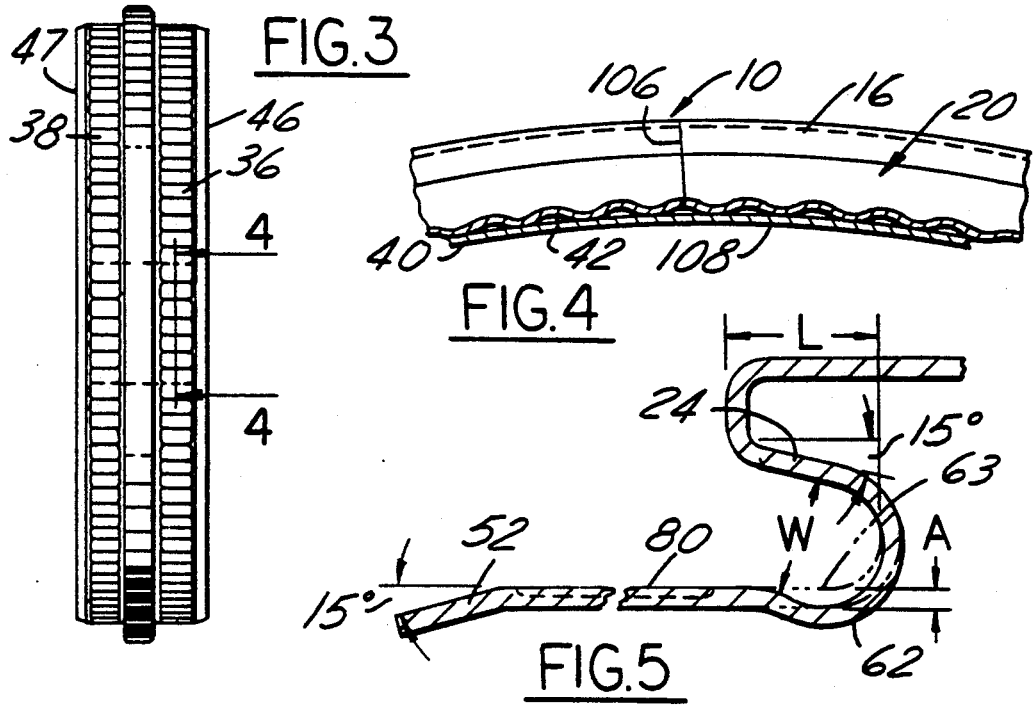
FIG. 3
FIG. 4
FIG. 5

COUPLING RING AND METHOD OF MAKING SAME

FIELD OF INVENTION

This invention relates to coupling rings for receiving and joining circular air ducts.

BACKGROUND OF THE INVENTION

Over the years, many suggestions have been made for joining circular air ducts. The following U.S. Patents suggest various couplings for circular or rectangular pipe:

| | |
|---|---|
| 180,416 | 3,689,114 |
| 1,921,642 | 4,447,078 |
| 1,762,766 | 4,558,892 |
| 1,811,277 | 4,669,762 |
| 3,415,543 | 4,941,693 |

Despite these coupling designs, the principal way in which circular ducts have been connected over the years is the use of the so-called double S-lock. Such is simply a strip of sheet metal that has been folded upon itself to provide oppositely opening grooves and then bent into circular configuration with the ends aligned and joined in any suitable fashion. Such double S-lock locks have been used for both circular and rectangular ducts. After they are installed, drive screws are inserted every 3" or so around the duct and then the joint is wrapped and painted to effect an airtight seal. While the double S locking joint is in itself inexpensive, the time required by the duct installer raises the cost per joint considerably. Effecting airtight joints in circular duct work has been quite labor intensive.

In U.S. Pat. No. 4,941,693, a connector is disclosed which is formed of two cylindrical shapes that must be deformed and thereafter nested and riveted together. The cost of manufacture of this coupling makes it expensive to use. In addition, because of the relatively long axial depth of the oppositely opening grooves in relation to their radial width, when sealant is placed in the grooves and it is then attempted to insert the ends of the ducts, a hydraulic lock tends to develop making it difficult to obtain satisfactory insertion of the duct ends in the grooves. Additionally, as the ducts are slid over the projecting flanges of the coupling, the sealant tends to be wiped off the flanges thereby destroying the seal between the duct and the coupling at such flanges. Clow U.S. Pat. No. 180,416 is similar to the structure of U.S. Pat. No. 4,941,693 and presents many of the same problems in its use.

U.S. Pat. No. 4,669,762 if somehow usable for circular duct work would create a hydraulic lock between the sealant, the duct and the coupling as the duct is inserted in the coupling.

My own prior U.S. Pat. No. 3,415,543 was never adapted for use with circular ducts and the relatively large channel section could not be bent into circular configuration.

SUMMARY OF THE INVENTION

I have disclosed a coupling ring for circular oval or flat oval ducts which may be manufactured at a low cost and installed quickly and easily by the duct installer. The coupling is formed of a single strip of sheet metal such as 22 gauge which is formed in the flat to exhibit an elongated rib disposed medially of the strip and providing oppositely opening duct receiving grooves. This strip is then hooped, i.e., bent into circular configuration, while simultaneously crimping the flanges to prevent distortion of the duct receiving grooves, and the ends are then brought into alignment and secured together as by welding to a butt block. Sealant is placed in the grooves prior to insertion of the ducts. Preferably the radial width of the grooves is between four and six times the wall thickness of the ducts and the axial length of each groove may be substantially equal to the width of the groove or not more than about 10% to 15% greater than the width. This avoids any hydraulic lock when the ducts and sealing rings are assembled. Fasteners may be driven through the ducts and flanges of the ring to lock them together.

BRIEF DESCRIPTION OF THE DRAWINGS

FIG. 1 is a schematic view of a portion of a duct system showing the utilization of my improved sealing ring;

FIG. 2 is a cross-sectional view taken along line 2—2 of FIG. 1;

FIG. 3 is a front elevation of a coupling ring embodying my invention;

FIG. 4 is a cross-sectional view taken along line 4—4 of FIG. 3;

FIG. 5 is an enlarged fragmentary cross-sectional view through one of the duct receiving grooves;

DESCRIPTION OF PREFERRED EMBODIMENTS

Figure 6:
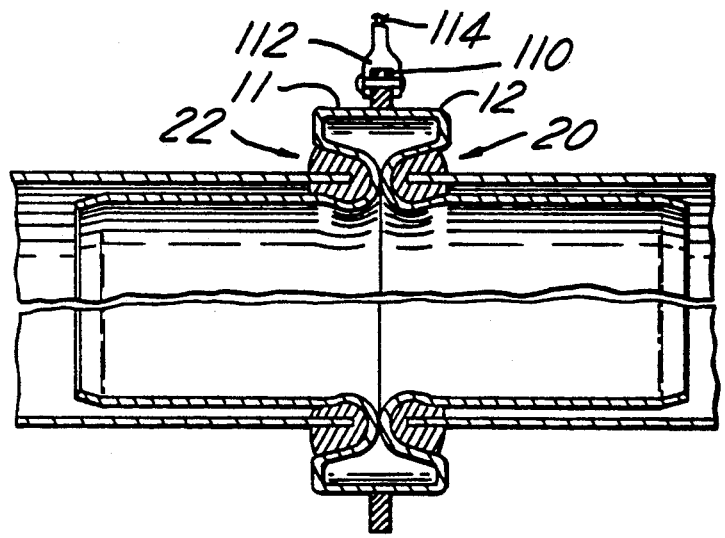
FIG. 6 is a view similar to FIG. 2 but showing a modification of the invention.

As shown in FIGS. 2 and 3, my improved sealing ring 10 is formed of a single strip of sheet metal shaped to provide oppositely extending cylindrical flanges 34 and 36 and a channel-shaped annular rib 11 encircling the flanges at their proximal ends and connecting them together. Axially outwardly opening grooves 20 and 22 at opposite sides of the rib 11 at the connection between the rib and the flanges are intended to receive the ends of the ducts 30 and 31 into which the flanges 34 and 36 are telescoped. Each flange is circumferentially crimped at 36 and 38 between the grooves 20 and 22 and the distal ends 46 and 47 of the flanges.

More specifically, the single strip of sheet metal is shaped to provide the annular rib 11 with an outer wall 12, opposed lateral edge walls 14 and 16 and an inner wall 18. The inner wall is bent upon itself to exhibit a pair of oppositely opening, annular, relatively shallow duct receiving grooves 20 and 22 heretofore mentioned. The grooves have radial outer wall portions 24 and 26 which overly the outside 28 and 29 of the duct elements 30 and 31 at the end edge 32 and 33. Inner cylindrical flanges 34 and 36 are intended to be received within the duct elements 30 and 31 and extend axially substantially beyond the rib 11. The flanges 34 and 36 are characterized by circumferential crimping 36 and 38 heretofore mentioned which extends completely around the ring having a succession of ridges 40 and grooves 42 which extend axially of the flanges from the outer end 44 spaced inwardly from the distal end 46 of the flange (or end 47 of the other flange) to an inner end 48 spaced slightly outwardly of the groove 20 and groove 22. From the outer end or edge of the crimping to the end of the flange, it is bent angularly inwardly as at 50 and 52 to form guiding ramp portions facilitating introduction of the flange into the ducts.

Thus, it will be noted that the inner wall 18 of the channel-shaped annular rib 11 comprises the pair of wall portions 24 and 26 which extend axially and radially inwardly from the lateral edge walls 14 and 16 toward each other and into abutment at 54 where they are reversely bent upon themselves to form the bottom 56 and 58 of the grooves 20 and 22. This reverse bend at the bottom walls 56 and 58 is somewhat teardrop-shaped at 60 and 62 forming a pocket at 64 and 66 to help retain in the grooves a sealant 68 and 70 which is placed in each groove prior to assembly of the coupling ring with the ducts, and preferably at the time of manufacture of the coupling ring as hereinafter mentioned. It is to be noted that between the inner ends of the crimps and the bottoms 56 and 58 of the grooves, the flange is smooth as at 59 within the pocket, thus facilitating the sealing between the opposed surfaces of the coupling ring and ducts.

In use, the duct elements 30 and 31 are telescoped over the flanges 34 and 36 and the edges 32 and 33 are forced into the sealant which is extruded back along the duct to form a visible bead along the outside 28 of the duct as shown in FIG. 2. The installer will be able to tell whether the duct has properly seated on the flange and whether a seal will be effected by observing whether the sealant has been extruded partially between the annular rib 11 and the outer surface of the duct completely around the duct. The duct may extend to the bottom walls 56 and 58 or may be spaced therefrom as shown in FIG. 2. In either event, when the duct has properly entered the grooves, there will be evidence of extrusion of the sealant between the rib and the duct and such extrusion should be substantially uniform all around the duct indicating a proper penetration of the duct within the sealant.

The ducts are retained in place on the ring by fasteners, one of which is shown at 74. The fasteners may be sheet metal drive screws of conventional construction. Three such fasteners driven equally spaced around each duct and into each flange should be sufficient for most installations. My coupling ring may be used for joining the ends of duct elements such as a "Y" 30 and straight ducts 31, 56 and 78 or simply a pair of straight duct sections as at 76 and 78 in FIG. 1. The width, or radial dimension 5D of the grooves 20 and 22 is about between four to six times, and preferably, five times the nominal wall thickness D of the typical duct section 30 to be joined by my sealing ring. In addition, the axial length L of the groove as shown in FIG. 5 is the same as or only slightly greater than the width W. In one embodiment, the length was only 10% greater than the width, and this proved quite satisfactory, though I believe the length could probably be up to as much as 15% greater than the width W. By providing these dimensional relationships, the duct elements may be easily assembled to the coupling ring without a hydraulic lock developing in the sealant between the coupling ring and the duct as occurs in the prior art and without wiping the sealant off the flange as would occur in a joint such as shown in U.S. Pat. No. 4,941,693.

Also, the pockets 64 and 66 in each groove will retain a quantity of the sealant to provide a continuous bead around the duct. These pockets 64 and 66 are formed at the time the strip is bent into its hoop shape and are displaced inwardly of the ring by the dimension A shown in FIG. 5 below the cylindrical surface 80 of the flange. Thus, sealant in such pockets will not be wiped therefrom by a duct end wiping over the surface 80 as it slides toward the bottom of the groove.

Figure 8:
FIG. 8 is a side elevation of a sheet metal strip which has been formed in the flat and prior to hooping.
Figure 9:
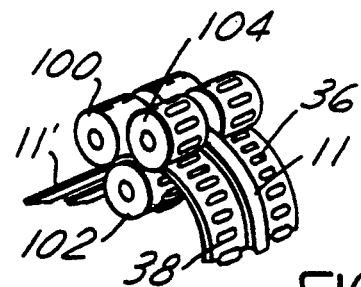
FIG. 9 is a schematic view of a set of hooping rollers for bending the flat strip of FIG. 8 into circular configuration and crimping the flanges.

To manufacture the coupling ring, a strip of sheet metal of 22 gauge (0.036 inches) LFQ, G-90 steel having straight parallel lateral edges 46 and 47 is fed lengthwise into a rolling mill (not shown) having sets of rolls which will form the channel-shaped rib 11', grooves 20 and 22, and the flanges, all in a flat strip as shown in FIG. 8 and in FIG. 5. In FIG. 5, the groove as rolled in the flat strip is shown in phantom outline curve 63. This strip is then bent into a hoop or annular shape with the rib 11' on the outside by feeding the strip through a second set of rolls 100, 102 and 104, and such additional rolls as necessary, as schematically shown in FIG. 9. At the time the strip is bent into its circular shape, the crimps 36 and 38 are formed in the flanges 46 and 47. This may be accomplished by having cooperating lands and grooves in the rolls 100, 102 and 104 and as the strip is passed between them and bent, the crimps are simultaneously formed. The number and depth of the crimps must be selected to prevent unwanted distortion of the grooves 20 and 22 during the hooping operation. This, in turn, will depend on the diameter of the ring to be formed, the gauge of metal being used, etc. At the time of hooping, the pockets 64 and 66 are formed in the grooves as a natural result of the bending of the strip.

Following hooping, the free ends of the strip are aligned as at 106 and a butt block 108 (FIGS. 3 and 4) may be spot welded over the meeting ends on the inside of the ring. I have also shown in FIG. 4 some of the angles that have proven satisfactory for the ramp portion 52 and the outer wall 24 of the rib.

In FIG. 6, I have shown a modification wherein a reinforcing annular flange 110 is disposed medially on outer wall 12 of the rib 11 and welded thereto. The flange may also be used advantageously to hang the coupling ring for supporting the duct, and for this purpose, a hanger 112 may be pinned or otherwise secured thereto with a tail 114 for attachment to the ceiling structure of the building in which the duct is to be installed.

Figure 7:
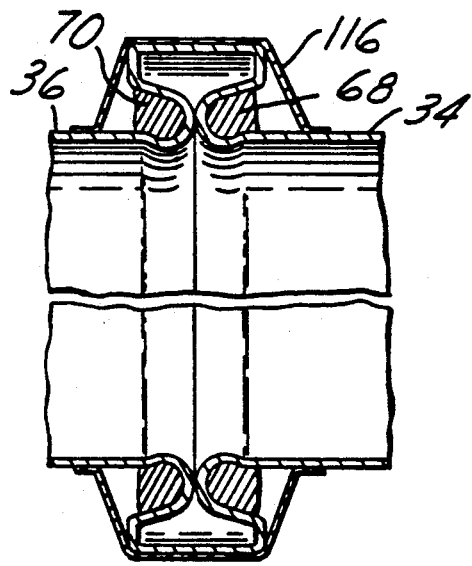
FIG. 7 is a fragmentary cross-sectional view similar to FIG. 2 but showing a stripable cover for protecting the sealant.

In a preferred embodiment, after manufacture of the coupling ring has been completed, the oppositely opening grooves 20 and 22 may have the sealant 68 and 70 deposited therein as shown in FIG. 7. To prevent this sealant from being contaminated or inadvertently displaced, a stripable cover 116 may be wrapped around the coupling ring over the rib and the grooves and about the flanges. This cover may be simply a thin, clinging-type plastic film or an adhesive coated fabric or plastic strip. The stripable cover will then be removed by the duct installer at the time the coupling is used.

Because of the construction of the annular rib 11, this coupling ring will allow the ducts to move slightly through a bending of the top wall 11 and the lateral edge walls 14 and 16 without destroying the seal between the duct elements and the grooves 20 and 22. Thus, if the duct is installed in a building subjected to seismic disturbances, the sealing ring should provide a continuing seal.

I have found that it is not necessary to trap a relatively long length of the duct in a coupling to effect a good seal and reliable joint. I avoid this by providing sealant between the coupling ring and both the inside and outside of the duct, and trapping the ends 32 and 33 against expansion by the overlying annular rib 11. Thus internal air pressure cannot cause the end of the duct to expand radially and break the seal.

My construction also allows a greater tolerance variation in duct diameter than does the prior art. In my design up to ⅛" variation in duct diameter can be accommodated which in a design such as that in U.S. Pat. No. 4,941,693 will required quite precise matching of the duct and the coupling.

My construction, because of the "I-beam" shape of the annular rib 11, is quite strong and resistant to collapse or buckle.

While the best mode for carrying out the invention has been described in detail, those familiar with the art to which this invention relates will recognize various alternative designs and embodiments for practicing the invention as defined by the following claims.

What is claimed is:

1. A coupling ring for receiving and joining circular air ducts comprising:
   a single piece of sheet metal shaped to provide oppositely extending cylindrical flanges and a channel-shaped annular rib encircling the flanges at their proximal ends and connecting them together;
   axially outwardly opening grooves at opposite sides of the rib at the connection between the rib and flanges for receiving the ends of ducts into which the flanges are telescoped for connecting the ducts; and
   each flange being circumferentially crimped between said grooves and the distal end.

2. The invention defined by claim 1 wherein each of said grooves has a radial width between approximately 4 to 6 times the nominal wall thickness of ducts to be joined and an axial length no greater than about 10–15% longer than the radial width.

3. The invention defined by claim 1 wherein a bead of sealant is disposed in each groove into which the ends of ducts are pressed when the flanges are telescoped into the ducts.

4. The invention defined by claim 3 wherein a protective stripable cover encircles the rib and flanges adjacent the grooves to prevent contamination of the sealant prior to use of the coupling ring.

5. The invention defined by claim 1 wherein said crimps extend axially of the flanges in circumferentially spaced relation.

6. The invention defined by claim 5 characterized by the crimps extending from the distal end of each flange toward but stopping short of the groove.

7. The invention defined by claim 6 wherein each groove adjacent the flange has a radially inwardly displaced pocket for receiving and retaining sealant for contact with a duct received in the associated groove.

8. The invention defined by claim 1 characterized by an annular flange encircling the rib and secured thereto for reinforcing the coupling ring.

9. The invention defined by claim 8 characterized by said annular flange being disposed medially of said rib.

10. The invention defined by claim 1 characterized in that said channel-shaped annular rib has an outer wall, opposed lateral edge walls, and an inner wall comprising a pair of wall portions extending axially and angularly inwardly from the lateral edge walls toward each other and each bent upon itself to form said grooves.

11. A method of making a coupling ring for receiving and joining circular air ducts comprising the steps of:
    providing an elongated strip of sheet metal having parallel lateral edges;
    forming said strip in a rolling mill to provide an elongated channel-shaped rib extending medially of the strip along the length thereof and disposed above and overhanging one face thereof and shaped to provide oppositely opening grooves beneath the rib;
    bending a length of the strip into annular configuration with the rib on the outside of the bend while simultaneously crimping the strip between the rib and the lateral edges of the strip; and
    joining the ends of said length of strip to make a continuous ring.

12. The invention defined by claim 11 wherein following joining of the ends, a sealant is placed in each groove.

13. The invention defined by claim 12 wherein following placement of the sealant, a stripable protective cover is wrapped over the rib and grooves to prevent contamination of the sealant.

* * * * *